US 6,722,260 B1

(12) United States Patent
Brown (10) Patent No.: US 6,722,260 B1
(45) Date of Patent: Apr. 20, 2004

(54) HYDRAULIC PISTON POSITION SENSOR (75) Inventor: Gregory C. Brown, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/316,478

(22) Filed: Dec. 11, 2002

(51) Int. Cl.[7] ................................................ F01B 25/26
(52) U.S. Cl. .............................. 92/5 R; 324/642; 91/1; 92/169.1
(58) Field of Search ............................. 92/5 R, 165 R, 92/169.1, 171.1; 91/361; 324/642

(56) References Cited

U.S. PATENT DOCUMENTS

| 3,160,836 | A | 12/1964 | Farley ........................ 336/30 |
| 3,714,846 | A | 2/1973 | Louis et al. ................. 74/687 |
| 3,744,344 | A | 7/1973 | Olsen et al. ................. 74/687 |
| 3,796,111 | A | 3/1974 | Schauer ....................... 74/687 |
| 3,903,756 | A | 9/1975 | Hamma ........................ 74/687 |
| 4,019,404 | A | 4/1977 | Schauer ....................... 74/687 |
| 4,126,047 | A | 11/1978 | Sethares et al. .............. 73/505 |
| 4,138,907 | A | 2/1979 | Melles ........................ 74/687 |
| 4,259,881 | A | 4/1981 | Meyerle ....................... 74/687 |
| 4,348,855 | A | 9/1982 | DePauw et al. .............. 56/10.2 |
| 4,471,668 | A | 9/1984 | Elsner ......................... 74/687 |
| 4,487,002 | A | 12/1984 | Kruse et al. ................. 56/10.2 |
| 4,520,660 | A | 6/1985 | Hitchcock .................... 73/120 |
| 4,543,649 | A | 9/1985 | Head et al. ................... 367/96 |
| 4,584,472 | A | 4/1986 | Wiblin et al. ................ 250/237 |
| 4,588,953 | A | 5/1986 | Krage ......................... 324/58.5 |
| 4,631,478 | A | 12/1986 | Knetsch et al. .............. 324/207 |
| 4,689,553 | A | 8/1987 | Haddox ..................... 324/58.5 C |
| 4,694,648 | A | 9/1987 | Beck, Jr. ..................... 60/452 |
| 4,737,705 | A | 4/1988 | Bitar et al. ................. 324/58.5 C |
| 4,742,794 | A | 5/1988 | Hagstrom .................... 114/286 |
| 4,749,936 | A | 6/1988 | Taplin ..................... 324/58.5 B |
| 4,757,745 | A | 7/1988 | Taplin ........................ 91/361 |
| 4,774,465 | A | 9/1988 | Nilius ......................... 324/208 |
| 4,866,269 | A | 9/1989 | Wlodarczyk et al. ....... 250/231 |
| 4,901,628 | A | 2/1990 | Krage ............................. 92/5 |
| 4,913,004 | A | 4/1990 | Panoushek et al. ........... 74/861 |
| 4,938,054 | A | 7/1990 | Dye et al. ....................... 73/3 |
| 4,961,055 | A | 10/1990 | Habib et al. ................ 324/662 |
| 4,987,823 | A | 1/1991 | Taplin et al. ................. 91/361 |
| 5,000,650 | A | 3/1991 | Brewer et al. .............. 414/699 |
| 5,072,198 | A | 12/1991 | Taplin et al. ................. 333/33 |
| 5,104,144 | A | 4/1992 | Bethell ....................... 280/707 |
| 5,150,049 | A | 9/1992 | Schuetz ...................... 324/207 |

(List continued on next page.)

FOREIGN PATENT DOCUMENTS

| DE | 31 16333 A1 | 4/1981 |
| DE | 4220333 | 12/1993 |
| DE | 43 11 084 | 9/1994 |
| DE | G 94 17 204 | 10/1994 |
| DE | 29616034 | 2/1997 |
| EP | 0 266 606 A2 | 10/1987 |
| EP | 0 444 472 A2 | 2/1991 |
| GB | 2 172 995 A | 10/1986 |
| WO | WO 98/23867 | 6/1998 |

OTHER PUBLICATIONS

Brochure: Technik, "Absolute Position Measurement Using Conductive Plastic Potentiometers".

(List continued on next page.)

Primary Examiner—Thomas E. Lazo
(74) Attorney, Agent, or Firm—Westman, Champlin & Kelly, P.A.

(57) ABSTRACT

A piston position in a cylinder of a hydraulic assembly is measured using microwave pulses. The microwave pulses are launched along a conductor coupled to the piston or cylinder. A sliding member is slidably coupled to the conductor and moves with the piston or cylinder. Position is determined as a function of a reflection from the end of the conductor and the sliding member.

31 Claims, 8 Drawing Sheets

U.S. PATENT DOCUMENTS

| | | | |
|---|---|---|---|
| 5,150,060 A | 9/1992 | Bitar | 324/635 |
| 5,182,979 A | 2/1993 | Morgan | 92/5 R |
| 5,182,980 A | 2/1993 | Greer | 92/5 |
| 5,233,293 A | 8/1993 | Huang et al. | 324/207 |
| 5,241,278 A | 8/1993 | Bitar | 324/635 |
| 5,247,172 A | 9/1993 | Riemer | 250/227.21 |
| 5,260,665 A | 11/1993 | Goldberg et al. | 324/636 |
| 5,274,271 A | 12/1993 | McEwan | 307/108 |
| 5,313,871 A | 5/1994 | Kaneko et al. | 91/361 |
| 5,325,063 A | 6/1994 | Morgan | 324/636 |
| 5,332,938 A | 7/1994 | McEwan | 307/572 |
| 5,345,471 A | 9/1994 | McEwan | 375/1 |
| 5,361,070 A | 11/1994 | McEwan | 342/21 |
| 5,365,795 A | 11/1994 | Brower, Jr. | 73/861.65 |
| 5,421,416 A | 6/1995 | Orbach et al. | 172/4 |
| 5,422,607 A | 6/1995 | McEwan | 333/20 |
| 5,424,941 A | 6/1995 | Bolt et al. | 364/148 |
| 5,438,261 A | 8/1995 | Codina et al. | 324/207.16 |
| 5,438,274 A | 8/1995 | Bitar et al. | 324/636 |
| 5,455,769 A | 10/1995 | Panoushek et al. | 364/424.07 |
| 5,457,394 A | 10/1995 | McEwan | 324/642 |
| 5,457,960 A | 10/1995 | Morishita | 91/361 |
| 5,461,368 A | 10/1995 | Comer | 340/607 |
| 5,465,094 A | 11/1995 | McEwan | 342/28 |
| 5,469,749 A | 11/1995 | Shimada et al. | 73/861.47 |
| 5,471,147 A | 11/1995 | Allen et al. | 324/635 |
| 5,471,162 A | 11/1995 | McEwan | 327/92 |
| 5,479,120 A | 12/1995 | McEwan | 327/91 |
| 5,491,422 A | 2/1996 | Bitar et al. | 324/636 |
| 5,494,142 A | 2/1996 | Kale | 192/12 |
| 5,505,267 A | 4/1996 | Orbach et al. | 172/3 |
| 5,510,800 A | 4/1996 | McEwan | 342/387 |
| 5,512,834 A | 4/1996 | McEwan | 324/642 |
| 5,517,198 A | 5/1996 | McEwan | 342/89 |
| 5,519,342 A | 5/1996 | McEwan | 327/94 |
| 5,519,400 A | 5/1996 | McEwan | 342/28 |
| 5,521,600 A | 5/1996 | McEwan | 342/27 |
| 5,523,760 A | 6/1996 | McEwan | 342/89 |
| 5,535,587 A | 7/1996 | Tanaka et al. | 60/427 |
| 5,536,536 A | 7/1996 | Kelley | 427/386 |
| 5,540,137 A | 7/1996 | Lark et al. | 92/5 R |
| 5,549,185 A | 8/1996 | Kale | 192/12 |
| 5,563,605 A | 10/1996 | McEwan | 342/202 |
| 5,573,012 A | 11/1996 | McEwan | 128/782 |
| 5,576,498 A | 11/1996 | Shambayati | 73/861.52 |
| 5,576,627 A | 11/1996 | McEwan | 324/639 |
| 5,581,256 A | 12/1996 | McEwan | 342/37 |
| 5,587,536 A | 12/1996 | Rasmussen | 73/744 |
| 5,589,838 A | 12/1996 | McEwan | 342/387 |
| 5,602,372 A | 2/1997 | Strelow | 200/81.9 R |
| 5,609,059 A | 3/1997 | McEwan | 73/290 R |
| 5,617,034 A | 4/1997 | Lark et al. | 324/635 |
| 5,661,277 A | 8/1997 | Graham, II | 200/81.9 R |
| 5,661,490 A | 8/1997 | McEwan | 342/387 |
| 5,667,452 A | 9/1997 | Coutant | 475/81 |
| 5,710,514 A | 1/1998 | Crayton et al. | 324/635 |
| 5,901,633 A | 5/1999 | Chan et al. | 92/5 R |
| 5,977,778 A | 11/1999 | Chan et al. | 324/635 |
| 6,142,059 A | 11/2000 | Chan et al. | 92/5 R |
| 6,267,042 B1 | 7/2001 | Nagai | 92/5 |
| 6,295,019 B1 | 9/2001 | Richards et al. | 342/125 |
| 6,296,081 B1 | 10/2001 | Nagai et al. | 187/394 |
| 6,297,773 B1 | 10/2001 | Fullerton et al. | 342/457 |
| 6,300,903 B1 | 10/2001 | Richards et al. | 342/450 |
| 6,318,524 B1 | 11/2001 | Lutz et al. | 188/284 |
| 6,357,993 B1 | 3/2002 | Burton | 414/724 |
| 6,359,445 B1 | 3/2002 | Pfizenmaier et al. | 324/636 |
| 6,397,745 B2 | 6/2002 | Koehler | 101/366 |
| 6,401,612 B2 | 6/2002 | Koehler | 101/365 |
| 6,484,620 B2 | 11/2002 | Arshad et al. | 92/5 |
| 6,509,733 B2 | 1/2003 | Blubaugh et al. | 324/207.13 |
| 6,588,313 B2 * | 7/2003 | Brown et al. | 92/5 R |

OTHER PUBLICATIONS

Brochure: Penny + Giles "Technology Leaders in Displacement Monitoring & Manual Control".
Brochure: DC Hydrostar, "Position Transducer".
"An LVDT Primer", *Sensors*, Jun. 1996, pp. 27–30.
"Understanding Magnetostrictive LDTs", W.D. Peterson, *Hydraulics & Pneumatics*, Feb. 1993, pp. 32–34.
Brochure: Penny + Giles Product Data, "Cylinder Transducer Model HLP100".
Magazine: "Not Just a Blip on the Screen", *Business Week*, Feb. 19, 1996, pp. 64–65.
"A Physician's Desk Reference", *American Institute of Physics*, New York, 1992, p. 201.
"Handbook of Chemistry and Physic", *CRC Press*, Ohio, 1975, p. E–223.
"The Electrical Engineering Handbook", by R.C. Dorf, *CRC Press*, 1997, p. 811–812

* cited by examiner

HYDRAULIC PISTON POSITION SENSOR

REFERENCE TO CO-PENDING APPLICATION

Applicant hereby references co-pending patent application U.S. Ser. No. 09/991,817, filed Nov. 19, 2001, entitled HYDRAULIC PISTON POSITION SENSOR, commonly assigned with the present application.

BACKGROUND OF THE INVENTION

The present invention relates to hydraulic pistons. More specifically, the present invention relates to position sensors used to sense the relative position between a piston and a hydraulic cylinder.

Hydraulic cylinders are used in a wide variety of applications, such as heavy equipment, to move large loads. Traditionally, the control of the hydraulic cylinder has been through an operator who visually observes the extension and position of the hydraulic cylinder and operates the control mechanisms accordingly. However, this technique is inaccurate and can lead to damage of the hydraulic equipment and the work piece being manipulated. Further, this technique cannot be used in situations in which the operator can not see the cylinder. In order to address these shortcomings, displacement sensors have been used to measure the position of a piston in a hydraulic cylinder.

Various types of displacement sensors are used to measure the relative position of the piston in the hydraulic cylinder. However, devices to remotely measure absolute displacement in harsh environments with a high degree of reliability are presently complex and costly. Examples of presently used technologies are Magnitostrictive devices that use time of flight of a mechanical signal along a pair of fine wires encased in a sealed metal tube, which is reflected back from a magnitostrictively induced change in the rod's mechanical properties.

Another technology uses an absolute rotary encoder, which is a device that senses rotation. The translational to rotary conversion is typically done with gears, or a cable or tape that is uncoiled from a spring loaded drum. Absolute encoders tend to suffer from limited range and/or resolution. Harsh environments that include high levels of vibration tend to exclude absolute etched glass scales from consideration due to their critical alignment requirements, their susceptibility to brittle fracture and intolerance to fogging and dirt. This technology also needs to re-zeroing of frequency.

Inferred displacement measurements such as calculating the translation of a cylinder by integrating a volumetric flow rate into the cylinder over time suffer from several difficulties. First, these devices are incremental and require frequent, manual re-zeroing. Secondly, they tend to be sensitive to environmental effects, such as temperature and density. They require measuring these variables to provide an accurate displacement measurement, Finally, integrating flow to determine displacement tends to decrease the accuracy of measurement. This technology also is limited by the dynamic sensing range of the flow measurement sensing technology. Flows above and below this range have very high errors.

One technique used to measure piston position uses electromagnetic bursts and is described in U.S. Pat. Nos. 5,977,778, 6,142,059 and WO 98/23867. However, this technique is prone to emitting radiation into the environment and is difficult to calibrate.

SUMMARY OF THE INVENTION

A device to measure relative position of a hydraulic piston in a cylinder includes a rod extending along the direction of movement of the piston which is fixedly coupled to one of end of the cylinder. The rod is configured to carry a microwave pulse. A sliding member is slidably coupled to the rod and fixedly coupled to the piston. The sliding member is configured to cause a partial reflection of the microwave pulse. The end of the rod also provides a reflection. Piston position is calculated as a function of reflected microwave pulses from the sliding member and the rod end.

DETAILED DESCRIPTION OF THE PREFERRED EMBODIMENTS

The present invention provides a technique for measuring the position of a piston relative to a cylinder of a hydraulic cylinder assembly. With the present invention, a microwave signal is used to measure the relative position of the piston in the cylinder. When such a technique is used to measure piston position, it is sometimes difficult to get an accurate position measurement because of noise and other problems associated with accurately obtaining such a measurement.

Figure 1:
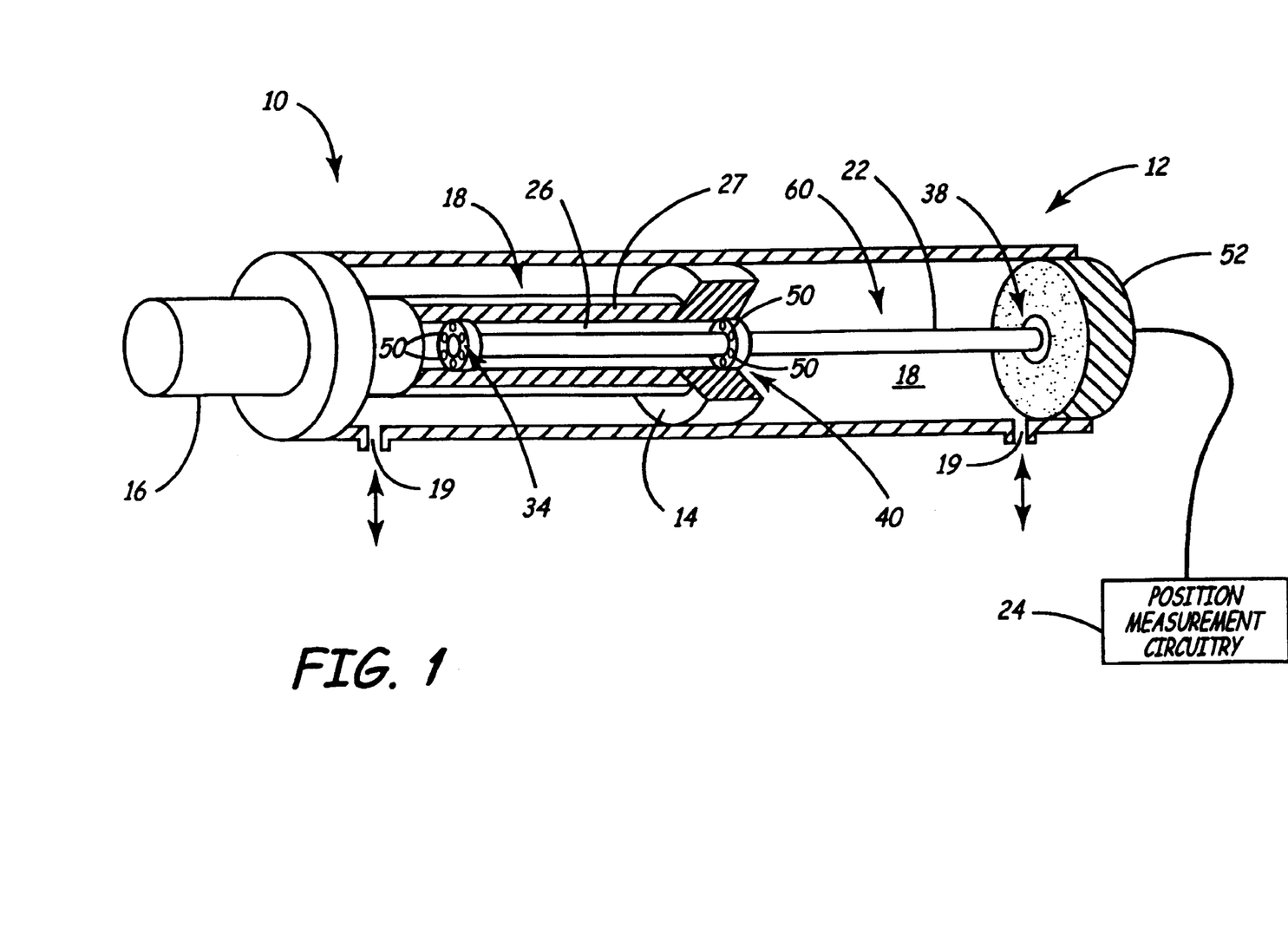
FIG. 1 is a side cutaway view of a hydraulic assembly including position measurement circuitry.

FIG. 1 is a perspective cross-sectional view of a hydraulic piston/cylinder assembly 10 in accordance with one embodiment of the invention. Assembly 10 includes cylinder 12 which slidably carries piston head 14 therein. Piston 14 is coupled to piston rod 16. Piston head 14 moves within cylinder 12 in response to hydraulic fluid 18 being applied to or withdrawn from the interior of cylinder 12 through an orifice 19. A seal extends around piston head 14 to prevent leakage of hydraulic fluid therepast.

An antenna rod 22 extends in the direction of cylinder 12 and is coupled to position measurement circuitry 24. A bore 26 extends through piston rod 16 and piston head 14 and receives antenna rod 22. Rod guides 34 and 40 couple to piston rod 16 and piston head 14, respectively and slide along antenna rod 22. Guides 34,40 reflect microwave pulses transmitted along antenna rod 22 as discussed below. Passageways 50 allow fluid 18 to pass through guides 34, 40. In this embodiment, guide 34 is fixedly coupled to antenna rod 22 and slides within bore 26 of piston rod 27 and guide 40 is fixedly coupled to piston head 14 and slides along antenna rod 22. Position measurement circuitry 24 couples to antenna rod 22 through feedthrough connection 38. The feedthrough connection includes cup 38 which extends from a base 52 cylinder 12 and couples rod 22 to position measurement circuitry 24.

In operation, piston 14 slides within cylinder 12 as hydraulic fluid 18 is injected into or removed from cylinder 12. Piston 14 also slides along antenna rod 22 which is received in bore 26 of piston 14. Contacting guide or bushing 40 rides along antenna rod 22 as piston 14 moves within cylinder 12. Although the antenna rod 22 is shown fixed to cylinder 12, it can also be fixed to piston 14 and move relative to cylinder 12. Other antenna rod configurations are shown in pending application U.S. Ser. No. 09/991,817, filed Nov. 19, 2001, entitled HYDRAULIC PISTON POSITION SENSOR.

Position measurement circuitry 24 provides a position output based upon reflections from microwave signals which are coupled to antenna rod 22. The microwave signal is reflected at two locations on antenna rod 22: at contacting guide or bushing 40 and at the rod end at guide or bushing 34. Position measurement circuitry is responsive to a ratio of the time delay between the two reflected signals to determine the relative position of piston 14 in cylinder 12.

In a preferred embodiment, the present invention utilizes Micro Time Domain Reflectometry Radar (MTDR). MTDR technology is a time of flight measurement technology. A well-defined impulse or pulsed microwave radar signal is coupled into suitable medium. The radar signal is coupled into transmission lines made in the shape of dual parallel conductors. This dual parallel conductor geometry is preferable because it limits radiated electromagnetic interference (EMI). The device responsible for the generation of the radar signal, the coupling of the radar signal into the transmission line, and the sensing of the reflected signal is referred to herein as the transducer.

The basic MTDR measurement is achieved by sending a radar pulse down a long, slender transmission line, such as antenna rod 22 in FIG. 1 and measuring to a high degree of accuracy the time required for the signal to travel down to a point of reflection and back again. This point of reflection can be from the distal end of the antenna rod 22 and may be through a mechanical body such as guide 34. If a mechanical body (sliding member 40) is made to move along the length of the transmission line, its position can be determined from the transit time of its reflected pulse. Specifically, a reference radar pulse that is sent to the end of the transmission line formed by antenna rod 22 at guide 34 is generated and timed. This is then compared to the pulse transit time reflected by the sliding mechanical body 40. One advantage of this technique is that the measurement is independent of the medium surrounding the transmission line. Various aspects of this measuring technique are shown and described in U.S. patent application Ser. No. 09/991,817, filed Nov. 19, 2001.

One advantage of this measurement technique is that the frequency of measurement occurs sufficiently rapidly to differentiate the position measurements in time to thereby obtain velocity and acceleration of the piston, if desired. In addition, by suitably arranging the geometry of the transmission lines, angular displacement or rotation of hydraulic actuators can also be measured.

The present invention is directed to features and configurations which improve position sensing of the hydraulic piston cylinder assembly 10. The invention provides improved functionality, reliability, accuracy and serviceability.

Figure 2:
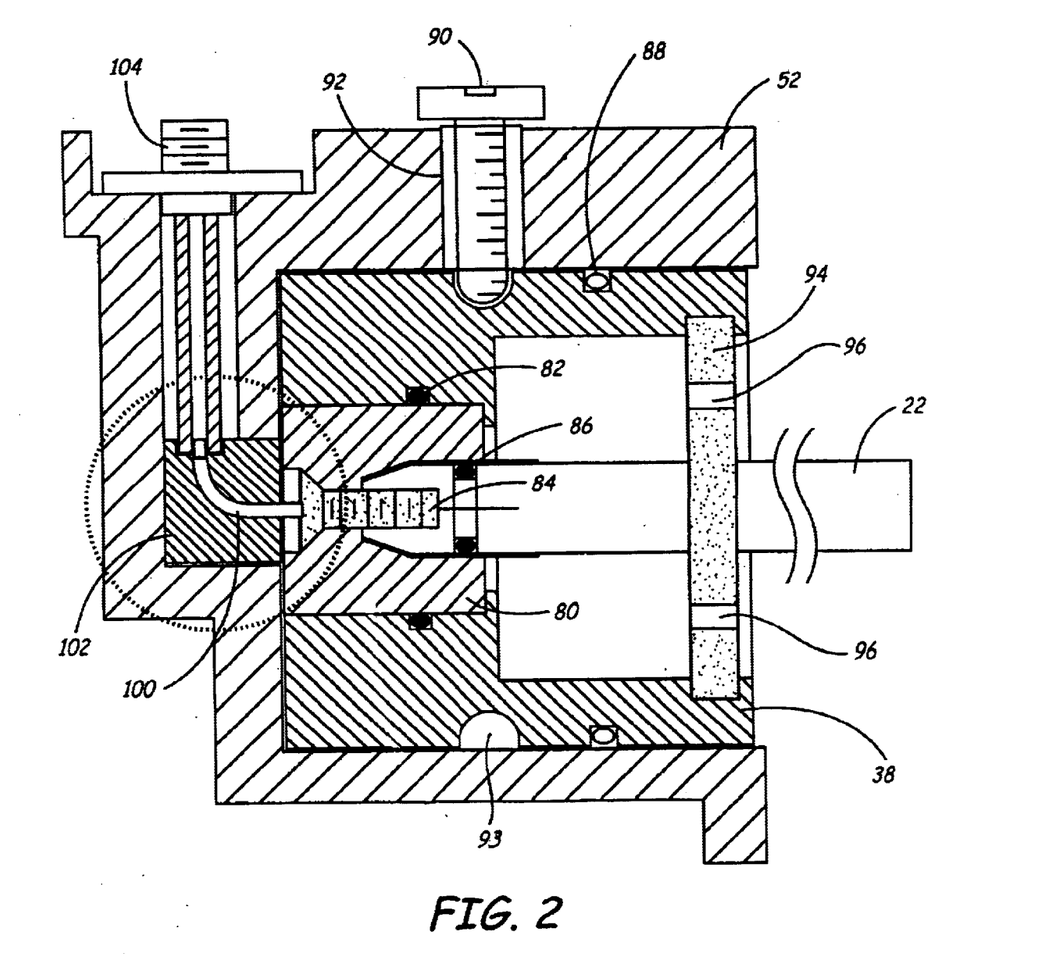
FIG. 2 is a cross-sectional view of a cup used to mount and electrically couple to an antenna rod.

FIG. 2 is a cross-sectional view of cup 38 in cylinder base 52 and illustrates one aspect of the invention. In some embodiments of assembly 10, it is very difficult to access the base area 52 of cylinder 12. In such configurations, it is very difficult to mount the antenna rod 22 to the cylinder 12. Cup assembly 38 provides a configuration which can be used to easily couple rod 22 to base 52. Further, the cup 38 can be removed if it is necessary to repair the assembly.

In one embodiment, cup 38 is received in a recess of cylinder base 52 and carries an insulator 80 therein. Insulator 80 receives antenna rod 22 and is set into cup 38. A gasket 82 seals insulator 80 in cup 38. Rod 22 is secured by a screw 84 to insulator 80 and is sealed by a gasket 86. The insulator 80 can be formed of any appropriate material such as a high strength ceramic like alumina. Alumina is well suited for handling stresses which arise during mounting or operation. Further, alumina can be highly polished such that it can receive an O-ring gasket to provide a tight seal.

Cup 38 seals to base 52 by gasket 88. A set screw 90 is used to fix the cup 38 and base 52. The set screw 90 extends through a bore 92 of base 52 and into a recess 93 of cup 38. Additional support can be provided to rod 22 using a support 94. Support 94 has openings 96 which allow hydraulic fluid to pass. Support 94 can be comprised of boron nitrate or other similar materials.

In this particular example embodiment, an electrical connection is made to rod 22 by conductor 100 which extends through an insulator 102 carried in base 52. The coupling between conductor 100 and screw 84 can be, for example, through a press fit or other suitable attachment technique. Conductor 100 extends to an RF coupling 104 which is configured to connect to a coaxial cable (not shown in FIG. 2) or the like and provides a ground connection to base 52. The cable couples to position measurement circuitry 24 shown in FIG. 1.

The rod 22 is mounted into cup 38 prior to assembly into the cylinder 12. With the rod 22 mounted in cup 38, the cup 38 is lowered into the recess in base 52 and secured in place using set screw 90. Should it be necessary to remove the antenna rod 22, set screw 90 can be removed to release cup 38 and the entire cup 38 lifted from base 52.

The connection to the antenna rod 22 is configured to reduce spurious reflections while supplying an insulator to mechanically support the rod 22. Spurious reflections can be reduced using gentle tapers and smooth transitions between the various components and by using components which have dimensions which are short with respect to the wavelength of the microwave pulse. Further, preferably an impedance mismatch is used to produce a fudicial pulse at the proximal end of the antenna rod 22. The support 94 can comprise a material which provides such an impedance mismatch to generate the fudicial pulse. The support 94 is separated from the insulator 80 by hydraulic fluid and may have a dielectric constant in the range of 8 to 10. Typically, the insulator 80 is only subjected to relatively small tensile stresses and moderate compressive loads during cylinder operation and can be made of any insulating material which is compatible with hydraulic oil and the desired temperature range. The use of boron nitrate for the support 94 provides a dielectric constant of about 4. However, any other appropriate material can be used. For example, polytetrafluoroethylene (PTFE) or glass-filled PTFE provides a dielectric constant of about 2.6 to 2.8 which is well suited for a typical cylinder installation. The materials may be selected to meet environmental or other requirements.

Figure 3:
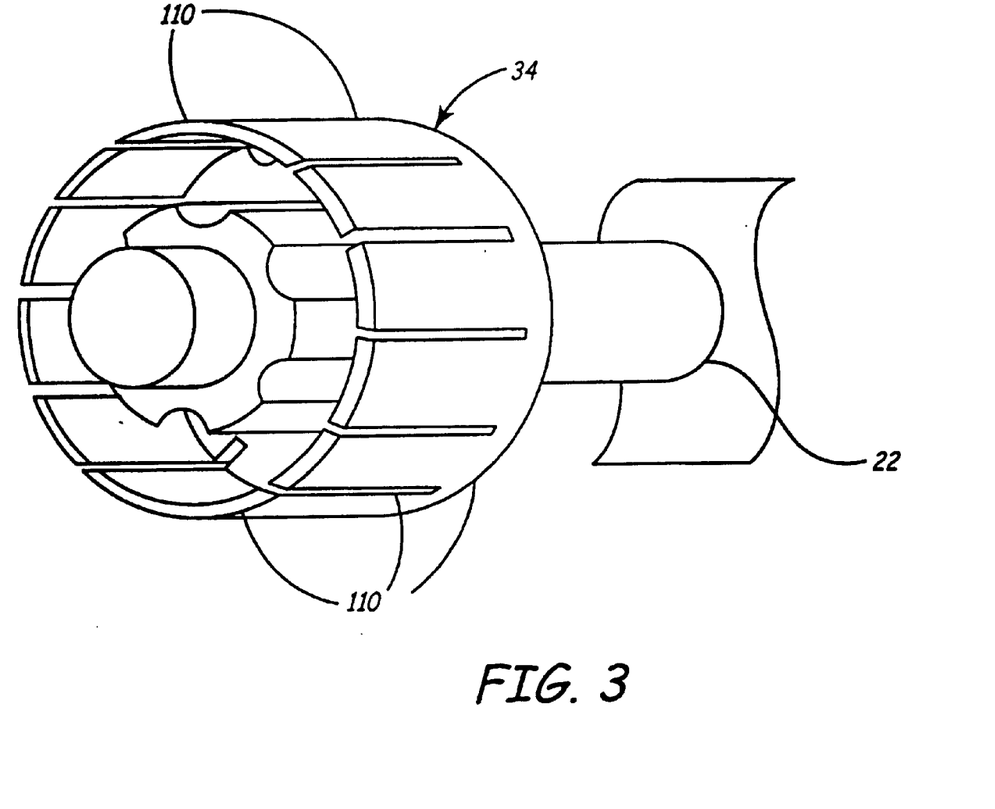
FIG. 3 is a perspective view of a bushing which couples to the antenna rod.

FIG. 3 is a perspective view of a bushing (or guide) 34 coupled to the distal end of rod 22 and illustrates another aspect of the invention. Bushing 34 provides an impedance mismatch by coupling the distal end of the rod 22 to the interior of piston rod 27. Bushing 34 is fixedly coupled to rod 22 through an adhesive, mechanical coupling or other technique and includes a plurality of spring loaded conductive fingers 110. Conductive fingers 110 are urged against the interior of bore 26 to make a solid and consistent physical contact with piston rod 27.

With this aspect of the invention, noise pulses which result in errors due to a poor coupling between the distal end of rod 22 and the piston rod 27 are substantially reduced. The spring loaded fingers 110 can adjust to variations in the diameter of bore 26 which can arise during the machining of bore 26 or over the lifetime of the system. Although spring loaded fingers 110 are shown, other techniques to provide a consistent electrical contact can be employed including the use of spring loaded contacts, ball bearings or other techniques. The bushing 34 can be fabricated of any appropriate conductive material such as a hard carbon steel. The material should be compatible with hydraulic fluid.

In various aspects, the spring loaded fingers 110 can be formed of a stamped spring with radial fingers, can comprise spring loaded spheres or semi-spherical shapes which press outwardly from a retaining cylinder, or stiff wire springs that are formed to contact the piston shaft counter bore and electrically attach to the end of the antenna rod. The bushing can be formed from the antenna rod itself and heat treated to provide the necessary contacting fingers. The contacts can also be formed of a conductive non-metallic material that is molded into an appropriate design. If a helical spring based contact is used, the inductance caused by the coiled spring may interfere with RF signals.

In another aspect, bushing 34 comprises a non-conductive material having a dielectric constant which is close to that of the hydraulic oil. In such an embodiment, the impedance mismatch at the end of the rod antenna 22 does not change substantially if contact between the bushing 34 and piston rod 27 changes. In this configuration, the return pulse from the end of the rod appears as a pulse having the opposite sign from the contacting case. In such an embodiment, the electrical connection between bushing 34 and piston rod 27 is not required or desired. In such an embodiment, the bushing can be fabricated using injection molding of, for example, PFA. Relief areas or cutouts should be provided to allow fluid passage. A ceramic, glass, polymer or elastomeric antenna rod terminator can also be used. If a polymer material is used, it can be unfilled or filled with non-conducting material such as glass.

Figure 4A:
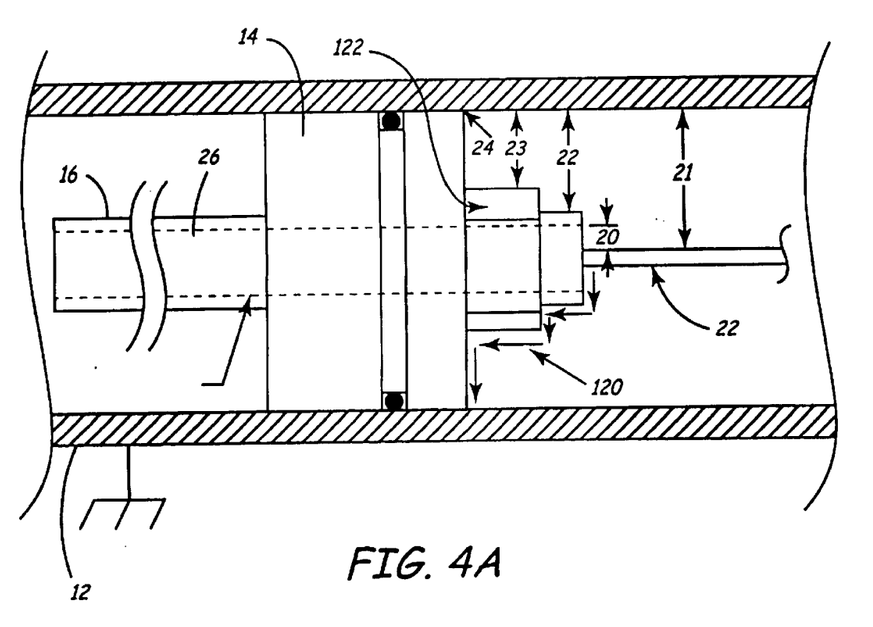
FIG. 4A is a side cross-sectional view illustrating impedance discontinuities at a face of a piston.

FIG. 4A is a cross-sectional view showing a typical face of piston 14. The microwave signal which travels along antenna rod 22 is reflected when it reaches the face of piston 14 due to the impedance mismatch between the piston face geometry and cylinder inner diameter with hydraulic oil as a dielectric. In order to accurately measure the position of the piston 14, it is important that the pulse reflected from the face of the piston 14 has a very well defined peak. For example, in the configuration shown in FIG. 4A, the piston face 122 has a number of discontinuities which cause spurious reflections of the microwave pulse.

During operation, the microwave pulse travels along antenna rod 22 and follows the ground path 120 between rod 22 and the electrical ground provided by the cylinder 12. Because RF signals travel along the outer surface of a conductor, the RF signal path to ground includes several impedance mismatches. The primary mismatch, and the mismatch which is used to identify piston position, is the $Z_0/Z_1$ mismatch (reference numbers 20/21 in FIG. 4A). However, additional impedance mismatches arise due to the geometry present at the face 122 of piston 14. Other impedance mismatches which will cause a reflection in the signal include the $Z_0/Z_2$ (20/22) mismatch, $Z_2/Z_3$ (22/23) mismatch and $Z_3/Z_4$ (23/24) mismatch as shown in FIG. 4A. In this configuration, the $Z_0/Z_2$ mismatch creates a negative going pulse while the other two impedance mismatches create positive going pulses. Each of these impedance mismatches create a reflected signal which can interfere with identification of the exact position of piston 14.

Figure 4B:
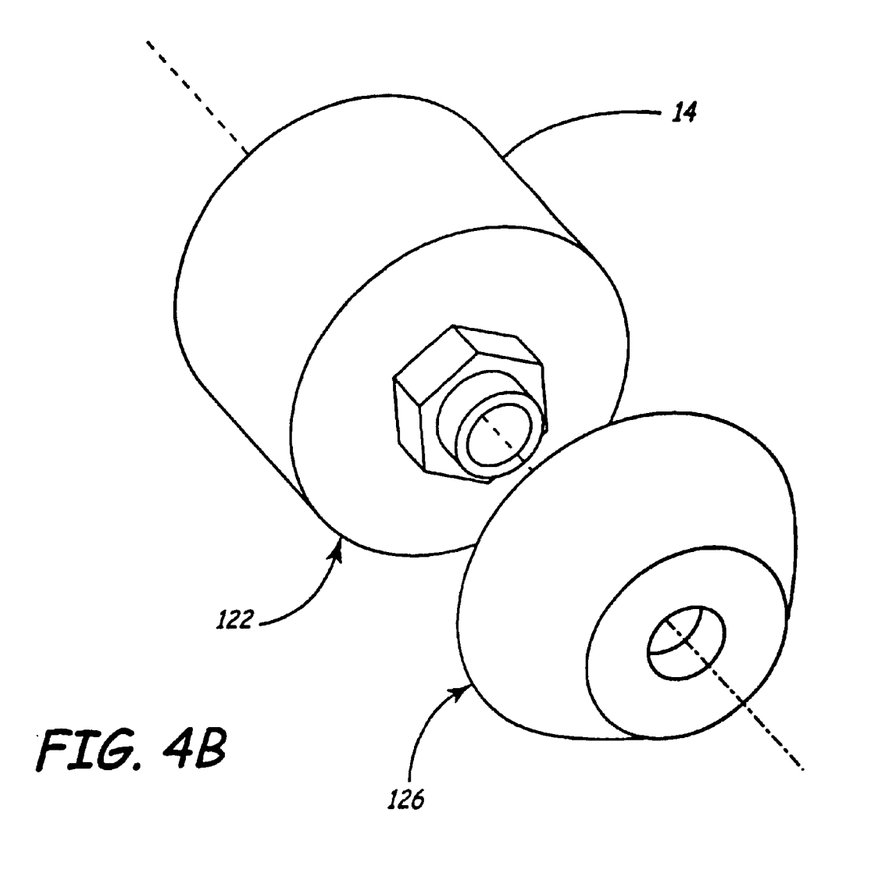
FIG. 4B is an exploded perspective view of a piston and cone piece.

FIG. 4B is an exploded perspective view showing a shroud 126 configured to cover the face 122 of piston 14. The shroud 126 preferably has a shape which provides a smooth transition to reduce the number of abrupt impedance changes and thereby reduce spurious reflections. In the embodiment shown in FIG. 4B, the shroud 126 has a cone shape. The shroud 126 should have a conductive surface and provide a smooth transition path for the RF pulse signal to follow to the electrical ground provided by cylinder 12. Such a configuration provides a smooth transition between the two and therefore the noise generated by multiple sharp transitions is reduced. The shroud 126 provides an impedance transition element. Any appropriate shape can be used to obtain a reflected signal having a desired characteristic.

Figure 5:
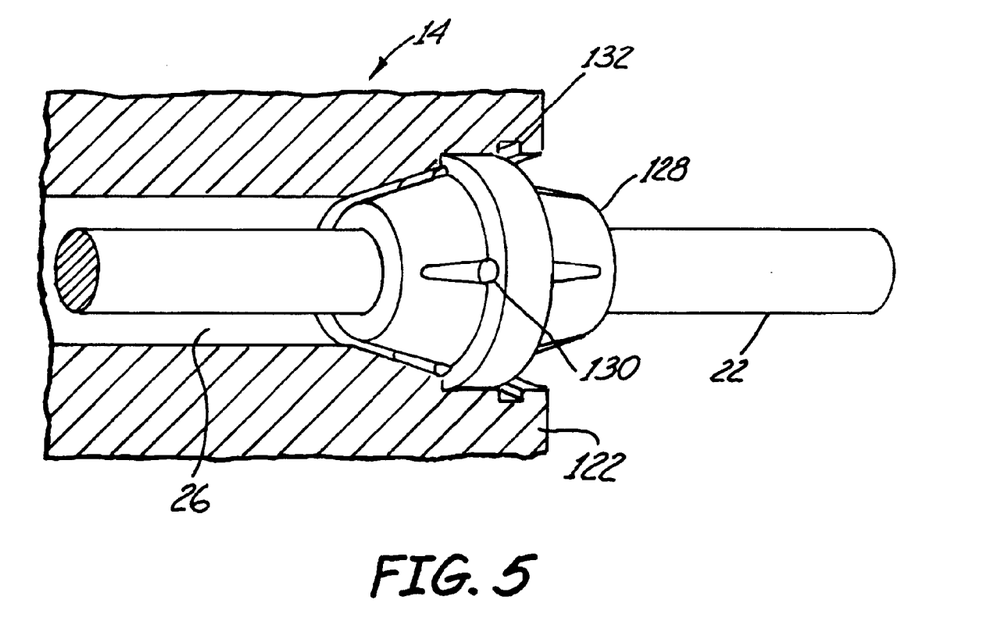
FIG. 5 is a cross-sectional view showing a piston face impedance mismatch element set in a piston face.

Pursuant to another aspect of the invention, FIG. 5 is a cross-sectional view showing a piston face impedance mismatch element 128 (sliding member 40 in FIG. 7) which is coupled to the piston face 122 and slidably receives antenna rod 22. To obtain accurate piston position measurements, it is important to have the pulse reflected from the piston face have proper characteristics which can be identified by signal processing circuitry. It is desirable to have a well defined piston face reflection that exhibits minimal ringing and has an amplitude that is largely unaffected by the position of the piston of the piston 14 within the cylinder 16. In addition, the impedance mismatch should allow enough of the microwave signal to pass through the mismatch to provide a strong reflection from the end of the antenna rod impedance rod mismatch. In FIG. 5, piston face impedance mismatch element 128 is formed of a material to provide an impedance mismatch and includes oil passages 130 formed therein. Oil passages 130 allows hydraulic fluid to pass through the mismatch element 128. Preferably, the mismatch element is made of an insulating material having a dielectric constant close to the dielectric constant of the hydraulic fluid. For example, glass-filled PTFE or PSA can be used. In general, in many instances in hydraulic cylinders it is desirable to have a material which exhibits "self healing" characteristics. PTFE or PFA polymers are such materials in that rough areas are "filled in" with PTFA or PFA polymer strings which are pulled from the element. These strings attach to the rough areas to prevent additional material loss. In the embodiment of FIG. 5, mismatch element 128 is set in piston face 122 and secured using any appropriate means. For example, a snap ring (not shown) can fit into a snap ring groove 132. A snap fit can also be used by providing small fingers on the periphery of the mismatch element 128 which fit into groove 132. Element 128 should be configured to easily slide along the length of antenna rod 22. Further, during operation, the mismatch element 128 may be deformed without a substantial degradation to the piston position measurements. Element 128 can couple to the piston face using a snap fit or other technique.

Figure 6:
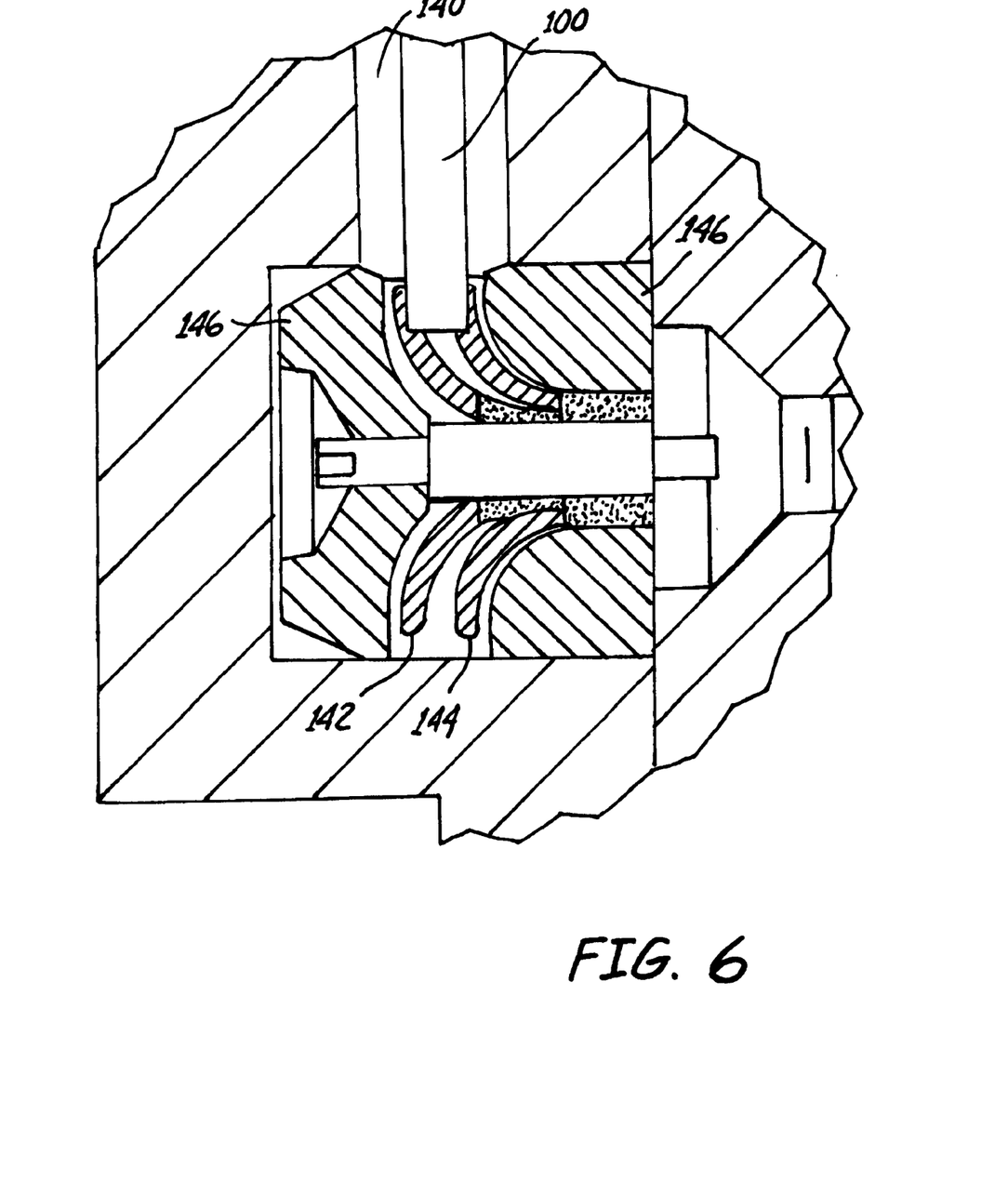
FIG. 6 is a cross-sectional view which shows an electrical coupling to an antenna rod.

FIG. 6 is a cross-sectional view similar to the section circled in FIG. 2 which shows another embodiment of cup 38. In FIG. 6, a bore 140 extends through base 52. Conductor 100 is received through bore 140 and makes electrical contact with contoured conductive discs 142 and 144 which are carried in an insulator 146. The discs 142 and 144 are spring loaded and are configured to provide a small opening therebetween. The discs 142 and 144 can be segmented by radial slots in the discs. This segmentation allows the discs 142 and 144 to deflect. Discs 142 and 144 are in electrical contact with screw 84 and thereby make electrical contact with antenna rod 22. Conductor 100 can be pressed into the opening between the discs 142 and 144 causing the spring loaded discs to spread and make electrical contact with the discs 142 and 144. This configuration is advantageous because the cup 38 can be rotated within base 52 and the electrical conductor 100 can be inserted between the discs 142 and 144 at any angle. The discs 142 and 144 are preferably configured to reduce RF reflections. For example, discs 142 and 144 can have a general funnel shape, and, in one embodiment, have a radius of about 0.25 inches. The discs 142 and 144 are fixed to the antenna rod 22 such that the diameters of the discs are normal to a center line of the antenna rod 22.

Figure 7:
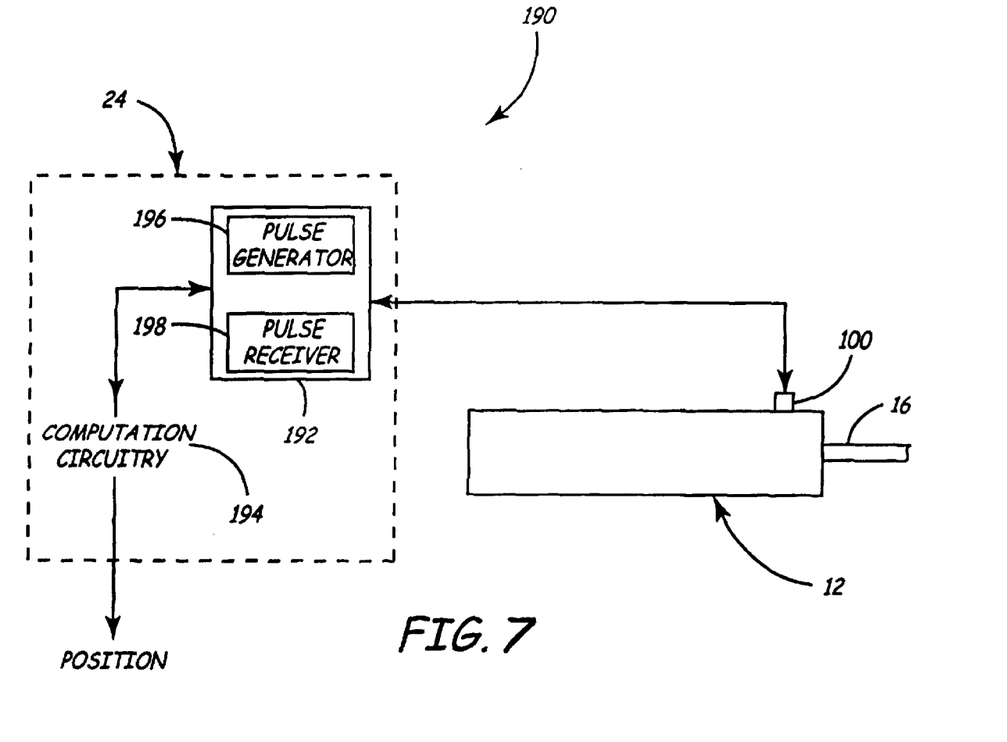
FIG. 7 shows a hydraulic system including a block diagram of position measurement circuitry.

FIG. 7 shows a hydraulic system 190 including a block diagram of position measurement circuitry 24. Position measurement circuitry 24 couples to antenna rod 22 through conductor 100 and includes microwave transceiver 182 and computation circuitry 184. Microwave transceiver circuitry 182 includes a pulse generator 186 and a pulse receiver 188 that operate in accordance with known techniques. Such techniques are described, for example, in U.S. Pat. No. 5,361,070, issued Nov. 1, 1994; U.S. Pat. No. 5,465,094, issued Nov. 7, 1995; and 5,609,059, issued Mar. 11, 1997, all issued to McEwan. Computation circuitry 184 measures the position of piston head 14 (not shown in FIG. 7) relative to cylinder 12 based upon the ratio of the time delay between the two return pulses: one from the end of the rod (member 34) and one from the sliding member 40 such as the face of piston 14 which slides along the rod. Based upon this ratio, computation circuitry 184 provides a position output. This can be implemented in a microprocessor or other logic. Additionally, analog circuitry can be configured to provide an output related to position. Other measurement techniques can be used such as those set forth in co-pending application U.S. Ser. No. 10/316,777, filed Dec. 11, 2002 which is incorporated herein in its entirety. For example, when the piston 14 is near the base 52, distance can be determined as a function of amplitude of fiducial reference pulse instead of using the time delay. Further, antenna rod 22 can include two conductors and switching circuitry can select between two conductors. One of the two conductors can be used as a reference to reduce errors due to erroneous reflections on the antenna rod 22. Signal processing techniques such as using digital signal processing circuitry can also be employed.

The present invention uses a ratio between two reflected signals in order to determine piston position. One reflected signal can be transmitted along the "dipstick" rod antenna from the contact point and another signal can be reflected from the end of the rod. The ratio between the time of propagation of these two signals can be used to determine piston position. Such a technique does not require separate compensation for dielectric variations in the hydraulic oil.

Various aspects of the invention include a piston or cylinder translational measurement device that uses MTDR time of flight techniques. Some type of contacting body should move along the transmission line antenna rod to provide an impedance mismatch to cause a reflection in the transmission line. The transducer and/or signal conditioning electronics can be sealed from harsh environmental conditions. An analog, digital or optical link can be provided for communicating the measured displacement to an external device.

The antenna rod can be fixed to the cylinder and a contact point coupled to the piston can move along the length of the rod. The contact point can also provide support for the rod or rods. The support can reduce or prevent excessive deflection during high vibration conditions or other stresses. A coupling can be provided to couple to the rod through the cylinder wall.

Various configurations can be used with the present invention. For example, the transducing element, signal generator and signal processing electronics can be mounted in an environmentally protected enclosure on or spaced apart from the cylinder. Preferably, the materials are compatible with long term exposure to hydrocarbons such as those present in a hydraulic cylinder.

In the present invention, an absolute measurement is provided and re-zeroing of the system is not required. The system is potentially able to measure piston position with an accuracy of less than plus or minus one millimeter. The maximum measurement length (span) of the system can be adjusted as required and is only limited by power and transmission line geometry. The system is well adapted for harsh environments by using appropriate materials, and providing a good static seal between the transducer and the transmission line. With the present invention, a fiducial (or reference) pulse is generated at a proximal end of the antenna rod. Signal processing can disregard any reflected signal which is received before the fiducial pulse is received. This provides a reference for the position calculations and greatly reduces the amount of signal processing necessary to remove noise from the reflected signal.

Although the present invention has been described with reference to preferred embodiments, workers skilled in the art will recognize that changes may be made in form and detail without departing from the spirit and scope of the invention.

What is claimed is:

1. An apparatus for measuring relative position of a hydraulic piston in a cylinder, comprising:
    an antenna rod extending in a direction of movement of the piston fixedly coupled to the cylinder, the rod configured to carry a microwave pulse between a coupling and a distal end of the rod;
    a sliding member slidably coupled to the piston, the sliding member configured to cause a partial reflection of the microwave pulse;
    microwave transceiver circuitry coupled to the rod configured to generate and receive microwave pulses;
    computation circuitry configured to calculate piston position as a function of reflected microwave pulses from the sliding member and the distal rod end; and
    an insulating receptacle mounted at one end of the cylinder configured to receive the antenna rod and physically couple the rod to the cylinder through an electrical insulator.

2. The apparatus of claim 1 including a spring loaded conductive bushing coupled to the antenna rod and slidably received in a bore of the piston to provide an electrical connection therebetween.

3. The apparatus of claim 1 including an insulating bushing coupled to the antenna rod and slidably received in a bore of the piston to provide reflected microwave pulse.

4. The apparatus of claim 1 including a piston face impedance transition element coupled to a face of the piston and arranged to provide a smooth impedance transition at the face of the piston and thereby reduce noise in microwave pulses reflected at the piston face.

5. The apparatus of claim 1 wherein the insulating receptacle includes an electrical conductor extending therethrough and coupled to the antenna rod, the electrical conductor having an opening formed by two spring loaded members configured to receive an electrical connector coupled to the microwave transceiver.

6. The apparatus of claim 5 wherein the two spring loaded members are disc shaped and configured to receive the connector around their entire periphery.

7. The apparatus of claim 1 wherein the cylinder includes a base having a cavity formed therein and the insulating receptacle is mounted in the cavity.

8. The apparatus of claim 7 including a set screw which secures the insulating receptacle in the cavity.

9. The apparatus of claim 7 including a seal around the insulating receptacle which seals the insulating receptacle in the cavity.

10. The apparatus of claim 1 including an electrical conductor in the insulating receptacle electrically coupled to the antenna rod.

11. The apparatus of claim 10 wherein the electrical conductor couples to electrical cabling which electrically connects the antenna rod to the microwave transceiver.

12. The apparatus of claim 10 including a gasket which seals the electrical conductor in the insulating receptacle.

13. The apparatus of claim 10 including a seal which seals the antenna rod in the insulating receptacle.

14. The apparatus of claim 1 including a support mounted to the insulating receptacle and having an opening therethrough configured to receive the antenna rod.

15. The apparatus of claim 14 wherein the support provides an impedance mismatch to generate reflected microwave pulses.

16. The apparatus of claim 1 wherein the sliding member comprises a piston face impedance mismatch element set in a face of the piston and slidably received by the antenna rod.

17. The apparatus of claim 16 wherein the piston face impedance mismatch element includes a passageway extending therethrough for passage of hydraulic fluid.

18. The apparatus of claim 16 wherein the piston face impedance mismatch element couples to the piston with a snap fit.

19. The apparatus of claim 16 wherein the piston face impedance mismatch element provides an opening therepast to allow flow of hydraulic fluid.

20. An apparatus for measuring relative position of a hydraulic piston in a cylinder, comprising:

an antenna rod extending in a direction of movement of the piston fixedly coupled to the cylinder and extending through the piston and a piston rod, the rod configured to carry a microwave pulse between a coupling and a distal end of the rod;

a sliding member slidably coupled to the piston, the sliding member configured to cause a partial reflection of the microwave pulse;

microwave transceiver circuitry coupled to the rod configured to generate and receive microwave pulses;

computation circuitry configured to calculate piston position as a function of reflected microwave pulses from the sliding contact and the distal rod end; and a spring loaded conductive bushing coupled to the antenna rod end and slidably received in the piston rod to provide an electrical connection therebetween.

21. The apparatus of claim 20 including an insulating receptacle mounted at one end of the cylinder configured to receive the antenna rod and physically couple the rod to the cylinder through an electrical insulator.

22. The apparatus of claim 20 including a piston face impedance transitional element coupled to a piston face arranged to provide a smooth impedance transition at the piston face and thereby reduce noise in the reflected microwave pulses.

23. The apparatus of claim 20 including a support configured to receive the antenna rod proximate the insulating receptacle.

24. The apparatus of claim 23 wherein the support provides an impedance mismatch to generate reflected microwave pulses.

25. The apparatus of claim 23 wherein the sliding member comprises a piston face mismatch element set in a face of the piston and slidably received by the antenna rod.

26. An apparatus for measuring relative position of a hydraulic piston in a cylinder, comprising:

an antenna rod extending in a direction of movement of the piston fixedly coupled to one of the piston or cylinder, the rod configured to carry a microwave pulse between a coupling and a distal end of the rod;

a sliding member slidably coupled to the piston, the sliding member configured to cause a partial reflection of the microwave pulse;

microwave transceiver circuitry coupled to the rod configured to generate and receive microwave pulses;

computation circuitry configured to calculate piston position as a function of reflected microwave pulses from the sliding contact and the distal rod end; and a piston face impedance transition element coupled to the piston face arranged to provide a smooth impedance transition at the piston face and thereby reduce noise in the reflected microwave pulses.

27. The apparatus of claim 26 wherein the piston face impedance transition element comprises a conductive cone shaped member which covers the piston face.

28. The apparatus of claim 26 including an insulating receptacle configured to physically couple to the antenna rod.

29. The apparatus of claim 26 including a piston face impedance mismatch element set in a face of the piston and slidably received by the antenna rod.

30. An apparatus for measuring relative position of a hydraulic piston in a cylinder, comprising:

an antenna rod extending in a direction of movement of the piston fixedly coupled to the cylinder and extending through the piston and a piston rod, the rod configured to carry a microwave pulse between a coupling and a distal end of the rod;

a sliding member slidably coupled to the piston, the sliding member configured to cause a partial reflection of the microwave pulse;

microwave transceiver circuitry coupled to the rod configured to generate and receive microwave pulses;

computation circuitry configured to calculate piston position as a function of reflected microwave pulses from the sliding contact and the distal rod end; and a bushing coupled to the antenna rod end and slidably received in the piston rod to provide an electrically insulated coupling therebetween and an impedance mismatch proximate the antenna rod end.

31. The apparatus of claim 30 including a piston face mismatch element set in a face of the piston and slidably received by the antenna rod.

* * * * *

UNITED STATES PATENT AND TRADEMARK OFFICE
CERTIFICATE OF CORRECTION

PATENT NO. : 6,722,260 B1 Page 1 of 1
DATED : April 20, 2004
INVENTOR(S) : Gregory C. Brown It is certified that error appears in the above-identified patent and that said Letters Patent is hereby corrected as shown below:

Column 1,
Line 44, delete "to".

Signed and Sealed this

Twenty-first Day of September, 2004

JON W. DUDAS
*Director of the United States Patent and Trademark Office*